United States Patent [19]
Henze et al.

[11] Patent Number: 4,855,888
[45] Date of Patent: Aug. 8, 1989

[54] CONSTANT FREQUENCY RESONANT POWER CONVERTER WITH ZERO VOLTAGE SWITCHING

[75] Inventors: Christopher P. Henze, Eagan; Ned Mohan, Minneapolis, both of Minn.; John G. Hayes, Camarillo, Calif.

[73] Assignee: Unisys Corporation, Blue Bell, Pa.

[21] Appl. No.: 259,673

[22] Filed: Oct. 19, 1988

[51] Int. Cl.$^4$ .............................. H02M 3/335
[52] U.S. Cl. ........................ 363/17; 363/41; 363/98; 363/132
[58] Field of Search .................. 363/15–26, 363/41, 95, 97, 98, 131–134

[56] References Cited

U.S. PATENT DOCUMENTS

| | | | |
|---|---|---|---|
| 4,071,812 | 1/1978 | Walker | 363/80 |
| 4,535,399 | 8/1985 | Szepesi | 363/41 |
| 4,630,187 | 12/1986 | Henze | 363/41 |
| 4,672,528 | 6/1987 | Park et al. | 363/98 |
| 4,694,383 | 9/1987 | Nguyen et al. | 363/98 X |
| 4,757,432 | 7/1988 | Hancock | 363/17 |

OTHER PUBLICATIONS

"Zero-Voltage Switching Technique in High Frequency Off Line Converter", M. Jovanovic et al, IEEE PESC Record 1988, pp. 23–32.
F. Tsai, P. Materu, F. C. Lee, "Constant Frequency, Clamped-Mode Resonant Converters," IEEE PESC Record 1987, pp. 557–566.
I. J. Pital, "Phase-Modulated Resonant Power Conversion Techniques for High Frequency Inverters," IEEE IAS Annual Meeting, Proceedings, Nov. 1986.
R. Oruganti, F. C. Lee, "Effects or Parasitic Losses on the Performance of Series Resonant Converter," IEEE-IAS Annual Meeting, Proceedings 1985.
K. Liu, F. C. Lee, "Zero-Voltage Switching Technique in DC/DC Converters," IEEE PESC Record; pp. 58–70, 1986.
K. Liu, F. C. Lee, "Resonant Switches–A Unified Approach to Improve Performances of Switching Converters," IEEE International Telecommunications Energy Conference Proceedings, pp. 344–351, 1984.

*Primary Examiner*—Patrick R. Salce
*Assistant Examiner*—Emanuel Todd Voeltz
*Attorney, Agent, or Firm*—Glenn W. Bowen; Robert S. Bramson

[57] ABSTRACT

A full bridge DC-DC series-resonant power converter is operated at a constant switching frequency using a phase delay between the transistor legs of the bridge to control the output voltage. All power semiconductor devices switch on and switch off at approximately zero volts while operating at a constant switching frequency which is above the resonant frequency of the resonant tank circuit. Zero-voltage switching increases the efficiency of the power converter and allows high frequency operation which minimizes component volumes. Constant frequency operation simplifies design of the magnetic components, confines the EMI spectrum to known frequencies and simplifies EMI design, and reduces the voltage and current excursions and thus reduces the peak component stress.

12 Claims, 2 Drawing Sheets

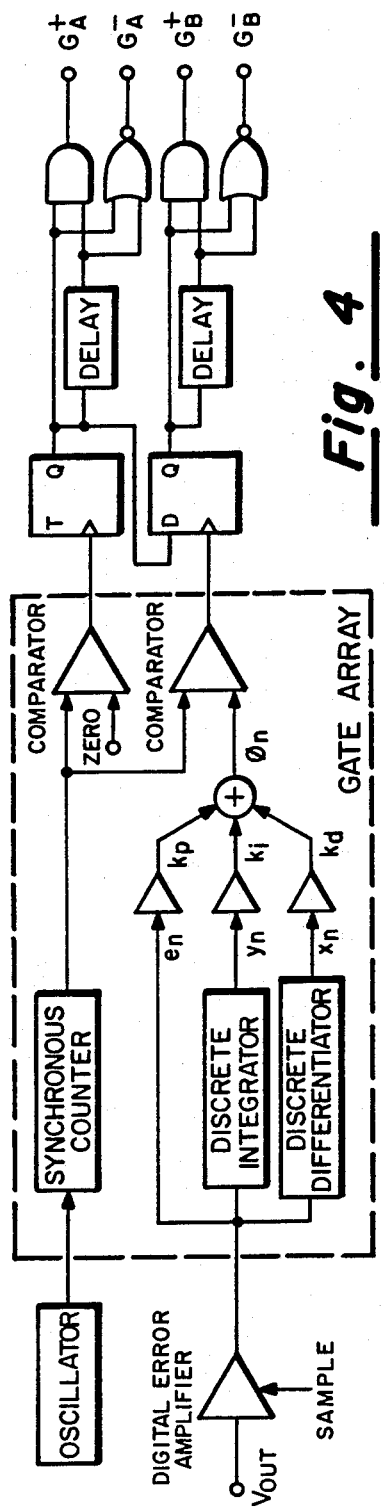
Fig. 4
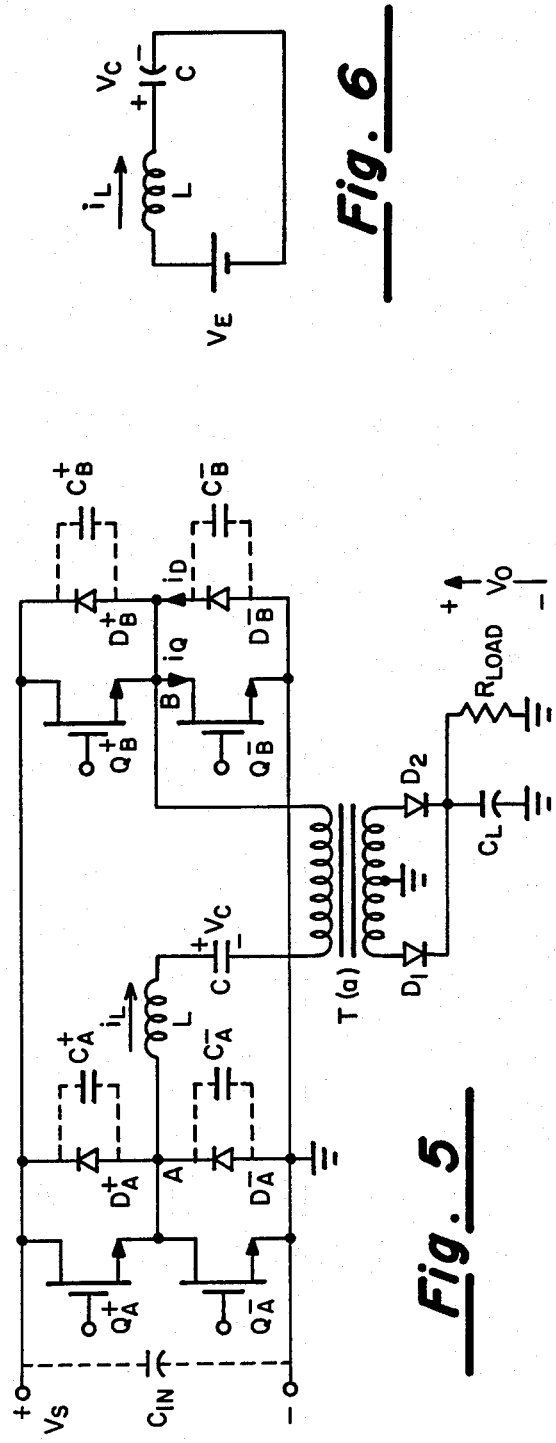
Fig. 6
Fig. 5

CONSTANT FREQUENCY RESONANT POWER CONVERTER WITH ZERO VOLTAGE SWITCHING

BACKGROUND OF THE INVENTION

Field of the Invention

The field of the invention is high frequency switching power converters, and, more particularly, resonant switching converters.

It is desirable to increase switching frequencies in DC-DC power switching converters to reduce the size and weight of transformer and filter components in DC-DC power converters. In order to keep the switching power losses low and to reduce the problem of electro-magnetic interference (EMI) resonant concepts have been proposed to allow zero-voltage and/or zero-current switchings so as to minimize switching losses. In such resonant converters, the output voltage is regulated by controlling the switching frequency. This has the drawback of making the control and the EMI filter design more complicated. Recently constant frequency control of resonant converters has been described in F. Tsai, P. Materu, and F. C. Lee, "Constant Frequency, Clamped-Mode Resonant Converters," IEEE PESC Record 1987, pp. 557-566 and I. J. Pital, "Phase-Modulated Resonant Power Conversion Techniques for High Frequency Inverters," IEEE IAS Annual Meeting, Proceedings 1986.

SUMMARY OF THE INVENTION

The present invention is directed to a resonant DC-DC converter with a constant frequency operating above its resonant frequency using a digital controller. A similar digital control has previously been implemented using duty-ratio quantization in DC-DC power conversion, and is described in U.S. Pat. No. 4,630,187, entitled "Power Converter with Duty Ratio Quantization" issued Dec. 16, 1986 to Christopher P. Henze.

A constant frequency quantized time delay technique is implemented in the digital controller of the patent in order to vary the output voltage of the series resonant converter. The digital controller provides a blank time between the conduction periods of the transistors to implement zero-voltage switching.

BRIEF DESCRIPTION OF THE DRAWINGS

FIG. 4 is a block diagram of a digital controller that may be used provide control signals for the power converter of FIG. 1.

FIG. 5 is a schematic of an alternate embodiment of the invention.

FIG. 6 is a general idealized circuit model of the invention that was used for analysis.

TECHNICAL DESCRIPTION OF THE INVENTION

Figure 1:
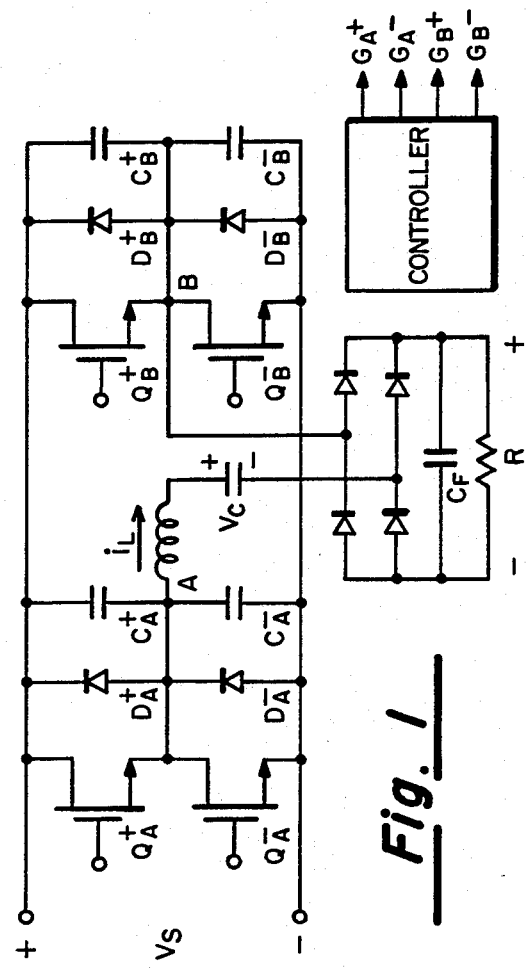
FIG. 1 is a schematic of the power converter of the present invention.

A full-bridge series resonant converter is shown in FIG. 1. The transistors are driven at slightly less than 50% duty cycle in the timing sequence shown in FIG. 2. Transistors $Q_A+$ and $Q_A-$ are gated by a $G_A+$ and $G_A-$ signals from the controller whose frequency determines the switching frequency $\omega_s$ of the converter. Transistors $Q_B-$ and $Q_B+$ are gated with a controllable time delay $\alpha/\omega_s$ with respect to the gating of transistors $Q_A+$ and $Q_A+$, respectively. The time delay $\alpha/\omega_s$ is the interval during which the voltage $v_{AB}$ in FIG. 1 is zero. By varying this time delay, the output voltage of the converter is controlled. The gating signals $G_B+$ and $G_B-$ are the signals supplied to the transistor $Q_B+$ and $Q_B-$.

Figure 2:
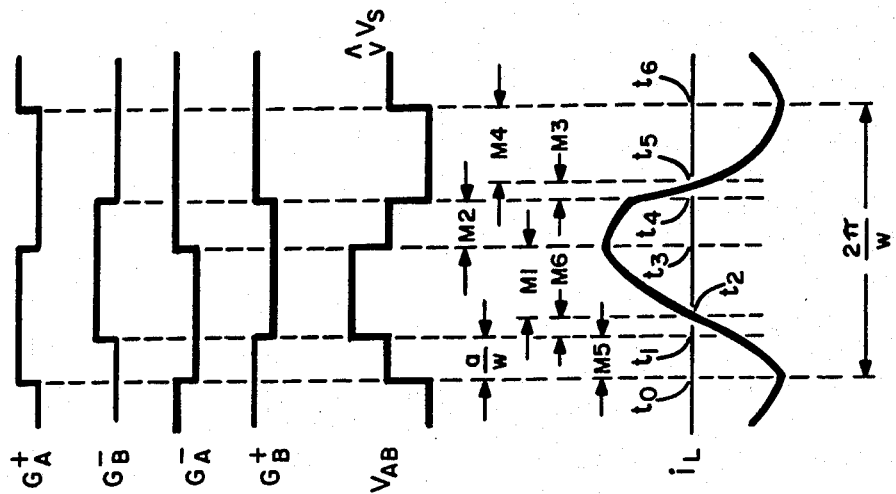
FIG. 2 is a timing diagram of various waveforms that are present in the power converter of FIG. 1.

Typical tank voltage and current waveforms which show zero-current, zero-voltage turn-on and zero-voltage turn-off are shown in FIG. 2. The corresponding gating waveforms are also shown. At $t_0$, the transistor $Q_a+$ is gated on, but it does not conduct until instant $t_2$. In the $t_0$-$t_2$ interval, diode $D_A+$ conducts the current $i_L$. The current changes polarity at $t_2$, turning diodes $D_A+$ and $D_B-$ off without a reverse recovery problem and transistors $Q_A+$ and $Q_B+$ now conduct. Both transistors $Q_A+$ and $Q_B-$ turn on at zero-voltage and zero-current. At instant $t_3$, the gate signal is removed from transistor $Q_A+$, thus turning it off.

Figure 3:
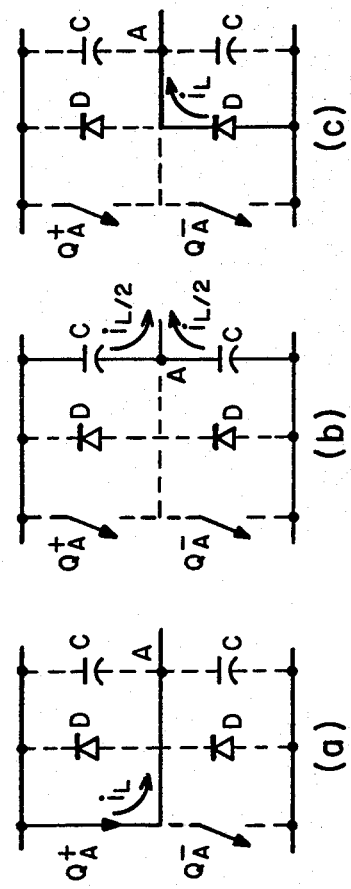
FIGS. 3a, 3b and 3c are partial schematics that illustrate the operations of the power converter of FIG. 1.

FIG. 3a shows the A-leg current flow in transistor $Q_A+$ prior to instant $t_3$ where the transistors and diodes are idealized to have zero internal capacitance. To enable a zero-voltage turn-off of $Q_A+$, a suitably valued capacitance $C_A+$ is connected across $Q_A+$ as shown in FIG. 1. Thus, by allowing a small blanking time during which transistors $Q_A+$ and $Q_A-$ are off (resulting in a slightly less than 50% duty cycle), capacitor $C_A-$ is discharged from the supply voltage to ground and capacitor $C_A+$ is charged to the supply voltage prior to diode $D_A-$ turning on, as seen in FIG. 3b.

FIG. 3c shows the conduction of diode $D_A-$ in the interval $t_3$-$t_4$. At instant $t_4$, transistor is turned off. Because of the direction of current $i_L$ as shown in FIG. 2, transistor $Q_B-$ turns off at zero voltage if a suitably valued capacitor is placed across transistor $Q_B-$. The switching and conduction mechanisms experienced by transistors $Q_A+$ and $Q_B-$ apply to transistors $Q_A-$ and $Q_B+$, respectively. In this mode of operation all transistors experience zero-voltage and zero-current at turn-on and zero-voltage at turn-off.

The digital controller of FIG. 4 supplies the gate signals $G_A+$, $G_A-$, $G_B+$ and $G_B-$, and is more completely disclosed in U.S. Pat. No. 4,630,187 entitled "Power Converter with duty Ratio Quantization" issued Dec. 16, 1986 to Christopher P. Henze, which is hereby incorporated by reference into this document. This digital controller may be used to provide quantized phase delay control of the converter switching signals to regulate the output voltage. Gate drive waveforms are generated using an 8-bit synchronous counter, digital comparators and flip-flops. Transistors $Q_A+$ and $Q_A-$ are driven from a flip-flop which is toggled each time the counter rolls over to zero. Transistors $Q_B+$ and $Q_B-$ are driven from a second flip-flop which is updated during the clock cycle at the time when the output of the synchronous counter and quantized phase delay are equal. Complementary driver signals with a fixed blanking time $t_b$ are generated by ANDing and NORing the flip-flop output signal with the same but slightly delayed signal (generated using a gated time delay line). The switching frequency $f_{sw}$ of the power converter is determined by the number of bits used and the oscillator frequency $f_{oss}$, as shown in the equation below:

$$f_{sw} = F_{oss}/2^{m+1}$$

Discrete proportional-integral-differential control can be used for output voltage regulation in this digital controller where the digital error amplifier provides a digital error signal $e_n$ which is an 8-bit digital word describing the difference between the actual output voltage and the desired output voltage that is updated each switching cycle. A quantized phase delay value $\phi_n$ is a 8-bit digital word that defines the phase delay between the transistors $Q_A+$, $Q_B-$ and $Q_A-$, $Q_B+$ of the H-bridge. Quantized phase delay value $\phi_n$ is calculated each switching cycle from a weighted summation of the digital error signal $e_n$, the discrete integral of the error $y_n$ and the discrete difference of the error $x_n$ as shown below:

$$\phi_n = K_p e_n + K_i y_n + K_d x_n$$

The weighting coefficients $K_p$, $K_i$ and $K_d$ and the gain of the error amplifier may varied to achieve the desired closed loop characteristics.

An alternate embodiment of the invention is shown in FIG. 5. The circuit is designed with an open-loop digital controller, for example, one using an 80 MHz oscillator may be suitable. Thus, by operating with a 0° to 180° range of phase delay, where 180° is the maximum possible value for $\alpha$ under any condition, and an 8-bit resolution, a switching frequency of 312.5 kHz may be obtained.

A computer program was developed to solve the state-plane equations. The inputs to the program are the input supply voltage $V_s$, output voltage $V_0$, transformer turns-ratio a, tank capacitor C, tank inductor L and the switching frequency $\omega_s$. L and C determine the natural frequency and the characteristic impedance of the tank.

It can be shown analytically that the boundaries of the region with zero-voltage switching depend on the normalized frequency $\omega_N$ and the normalized output voltage $V_{ON}$. As stated previously, the control variable is the phase delay $\alpha$. With normalized outputs volta $V_{ON}$ and normalized switching frequency $\omega_N$ as the inputs, the computer program, using an iterative procedure, determines the bounds on the phase delay $\alpha$ and normalized output current $I_{ON}$ which allow zero-voltage switching to take place.

A state-plane analysis has been carried out to determine the limits on the circuit conditions which result in zero-voltage switching. In this analysis, the output capacitor C was sufficiently large to justify the assumption of a constant output volta $V_0$ during a switching period. This simplified the analysis since only two energy storage elements remain. For analysis it was also assumed that the transistor switches, inductor and capacitor are ideal and the blanking time may be neglected.

Continuous current conduction operation with zero-voltage switching consists of a maximum of six modes. The general circuit model is shown in FIG. 6 where an equivalent DC voltage source $V_E$ is suddenly applied at time $t_0$. The initial conditions are $I_{L0}$ and $V_{C0}$. Using the inductor current $i_L$ and the capacitor voltage $v_C$ as the state variables, the circuit equations are:

$$L di_L/dt + v_C = V_E \tag{1}$$

and $$C dv_C/dt = i_L \tag{2}$$

Solving equations (1) and (2) for $t > t_0$:

$$i_L(t) = I_{L0} \cos\omega_0(t - t_0) + \frac{V_E - V_{C0}}{Z_0} \sin\omega_0(t - t_0) \tag{3}$$

and $$V_C(t) = V_E - (V_E - V_{C0})\cos\omega_0(t - t_0) + Z_0 I_{L0} \sin\omega_0(t - t_0) \tag{4}$$

where $Z_0$ and $\omega_0$ are the characteristic impedance and the resonant frequency of the LC tank, respectively defined by:

$$Z_O = \sqrt{L/C}$$

and $$\omega_o = \frac{1}{\sqrt{LC}}$$

The circuit currents and voltages are normalized with respect to a unit current of $V_s/Z_0$ and a unit voltage of $V_s$, respectively. The switching frequency $\omega_s$ is normalized by dividing $\omega_s$ by the resonant frequency $\omega_o$ to get the normalized frequency $\omega_N$. Note that all normalized quantities have N as a subscript, for example $V_{EN}$. The equation for the state plane trajectory is given by:

$$I_{LN}^2 + (V_{EN} - V_{CN})^2 = I_{LON}^2 + (V_{EN} - V_{CON})^2 = R^2 \tag{5}$$

High speed switching requires use of MOSFETs as the switching devices. Schottky diodes are used as the feedback diodes because their high anode to cathode capacitance provides snubber capacitance which may eliminate the need for additional external snubber capacitors.

The state-plane analysis results show that as the switching frequency is decreased to be closer to the resonant frequency of the tank, higher output currents are available. Variations in switching frequency also affect the phase delay range over which the zero-voltage switching can be obtained. Thus, it is clear that if a wide load range is required, the closer the switching frequency must be to the resonant frequency. However, a lower switching frequency causes greater stresses on the circuit components and higher conduction losses in the circuit resulting in reduced efficiency. A normalized switching frequency of 1.4 was chosen as a practical design frequency by taking the above factors into consideration.

The characteristic impedance of the tank $Z_0$ is an important factor in the circuit design. A high characteristic impedance $Z_0$ results in reduced currents and hence reduced conduction losses in the circuit. Thus, similar to the switching frequency $\omega_s$, the characteristic impedance $Z_0$ is also a critical factor. Increasing the value of the characteristic impedance $Z_0$ reduces the range in which the output current can be varied. However, reducing the characteristic impedance $Z_0$ increases stresses and conduction losses in the tank and also increases regeneration of the tank energy to the source. For example, a natural tank frequency of 220 kHz ($\omega_N = 1.42$) and a tank impedance of 47$\Omega$ may be chosen. To satisfy these requirements the tank capacitance and inductance have values of 15 nF and 35 μH, respectively.

It is important to note that the state-plane analysis produces results for the idealized case only. The effects of the on-resistance of the MOSFETs and diodes, the ESR of the tank capacitor and inductor and other parasitic effects have not been taken into account. These losses are usually lumped together and represented by a series resistance in the idealized circuit of FIG. 6. Inclusion of this resistance acts as a damping element in the circuit and there is a consequent reduction in the natural frequency of the LC tank.

R. Oruganti and F. C. Lee, "Effects or Parasitic Losses on the Performance of Series Resonant Converter," IEEE-IAS Annual Meeting, Proceedings 1985 looks at a series resonant converter from the point of view of losses and concludes that the validity of the lossless analysis is decreased as the switching frequency approaches the resonant frequency and also as the output voltage approaches the supply voltage. Thus, in the experimental analysis of this circuit, the theoretical results are used only to confirm the general voltage and current waveforms and general load ranges.

There is typically a 3 to 4 percent difference in converter efficiency over the load range for a constant output voltage. For example, the efficiency varies from 80% to 83% for an output of 16 V. As predicted by the state-plane analysis the current range is greatest for the lower output voltage. For $V_o = 8$ V, if the load range is designed to be 0.9 A, then the output current can decrease down to 0.68 A (i.e., roughly 30% deduction in power) while the converter keeps operating a zero-voltage switching. For the 16 V output only a 20% decrease is achieved.

Note that the above efficiencies and load ranges can be greatly improved by optimizing the components in the power circuit. One version of the circuit employed IRF512 MOSFETs and these have a relatively high on-resistance of $0.8_Ω$ resulting in high conduction losses. Analysis shows that the conduction losses in the MOSFETs account for up to 10% of the input power to the converter. Hence replacement of these devices by MOSFETs of lower on-resistance and improved design of the magnetizing components will increase the converter efficiency.

Operation of the constant frequency series resonant converter of the present invention offers several advantages. Design of magnetic components is easier at a constant frequency of operation. High frequency operation reduces the weight and size of the components. Quantized duty ratio control is more easily implemented to regulate the output voltage of the converter. In a practical circuit, the snubber capacitance required is small and may be provided by the parasitic capacitance of the MOSFETs and Schottky diodes.

We claim:

1. A resonant DC-DC switching power converter comprising rectifier means, switching means having a current path coupled to an input DC source and to said rectifier means, series inductance means, series capacitance means, wherein said series inductance means and said series capacitance means are coupled in series with each other and to said rectifier means in order to form a series circuit that is resonant at a predetermined frequency, and control means for operating said switching means when a voltage that is approximately zero exists across said current path so as to provide a series bidirectional current through said inductance means of a frequency that is greater than said predetermined resonant frequency.

2. A power converter as claimed in claim 1 wherein said switching means comprises first and second timing means wherein said rectifier means has first and second terminals, and said first timing means is coupled to said first terminal and said second timing means is coupled to said second terminal.

3. A power converter as claimed in claim 2 comprising control means, load means having first and second connections capacitor and first and second source terminals wherein said first timing means comprises first and second controllable current-path means for coupling said first and second terminals to a common point which is in the series current path of said inductance means, and said capacitance means is also coupled to said first connection means, and said second timing means comprises third and fourth controllable current-path means for coupling said first and second terminals to a common point B which is in the series current-path of said inductance means and said capacitance means, and is also coupled to said second connection means, and said control means provides digital control signals to said first, second, third and fourth controllable current-path means which results in a tri-level voltage across points A and B that comprise fixed pulse signals in which the pulse level remains at each of three levels for predetermined durations that provide a series bidirectional current through said inductance means of a frequency that is greater than said predetermined resonant frequency.

4. A power converter as claimed in claim 3 wherein said first, second, third and fourth controllable current-path means are field-effect transistors comprising gate means, and said control means is coupled to said gate means of all of said controllable current-path means.

5. A power converter as claimed in claim 4 wherein said control means supplies a different digital control signal to each of said controllable current-path means.

6. A power converter as claimed in claim 5 wherein said field-effect transistors have unibidirectional current means coupled across each of said field-effect transistors that operate to provide a current path when the associated field effect transistor is turned off by said control means.

7. A resonant DC-DC switching power converter comprising first timing means coupled to an input DC source, series inductance means, series capacitance means, rectifier means and second timing means coupled to said rectifier means, wherein said series inductance means and said series capacitance means are coupled in series with each other and to said rectifier means to form a series circuit that is resonant at a predetermined frequency, the series combination of said inductance means, series capacitance means and said rectifier means being coupled to a point A to which said first timing means is also coupled, and to a point B to which said second timing means is also coupled, and control means for operating said first and second timing means to provide tri-level voltage output pulse train across points A and B that comprises fixed pulse signals in which the pulse level remains at each of three levels for predetermined durations that provide a series bidirectional current through said inductance means of a frequency that is greater than said predetermined resonant frequency.

8. A power converter as claimed in claim 7 wherein said rectifier means has first and second terminals, and said first timing means is coupled to said first terminal and said second timing means is coupled to said second terminal.

9. A power converter as claimed in claim 8 comprising load capacitor means having first and second connections and first and second source terminals, wherein said first timing means comprises first and second controllable current-path means for coupling said first and second terminals to said point A which is also coupled to said first connection means, and said second timing means comprises third and fourth controllable current-path means for coupling said first and second terminals to said point B which is also coupled to said second connection means, and said control means provides digital control signals to said first, second, third and fourth controllable current-path means.

10. A power converter as claimed in claim 9 wherein said first, second, third and fourth controllable current-path means are field-effect transistors comprising gate means, and said control means is coupled to said gate means of all of said controllable current-path means.

11. A power converter as claimed in claim 10 wherein said field-effect transistors have unibidirectional current means coupled across each of said field-effect transistors that operate to provide a current path when the associated field effect transistor is turned off by said control means.

12. A power converter as claimed in claim 11 wherein said control means supplies a different digital control signal to each of said controllable current-path means.

* * * * *